United States Patent Office 3,586,717
Patented June 22, 1971

3,586,717
BIS(FLUOROALIPHATICSULFONAMIDOPHENYL) DERIVATIVES
Joseph K. Harrington, Edina, Minn., assignor to Minnesota Mining and Manufacturing Company, St. Paul, Minn.
No Drawing. Continuation-in-part of application Ser. No. 588,338, Oct. 21, 1966. This application Mar. 17, 1969, Ser. No. 807,906
Int. Cl. A01n 9/16; C07c 143/74
U.S. Cl. 260—556
13 Claims

ABSTRACT OF THE DISCLOSURE

Bis(fluoroaliphaticsulfonamidophenyl) derivatives wherein the phenyl rings are joined by a carbon-carbon bond, a methylene or ethylene radical, divalent sulfur or oxygen or a sulfinyl or sulfonyl group are disclosed. The phenyl rings are optionaly substituted. These compounds and their salts have utility as monomers, intermediates, polymerization catalysts and initiators and polymer crosslinkers and chain extenders. Some of the compounds of this invention are also active herbicides and plant growth modifying agents.

CROSS-REFERENCES TO RELATED APPLICATIONS

This application is a continuation-in-part of copending application Ser. No. 588,338, filed Oct. 21, 1966 and now abandoned.

BACKGROUND OF THE INVENTION

Field of the invention

The compounds of this invention are sulfonamides. More specifically the compounds are bis(fluoroaliphaticsulfonamidophenyl) derivatives. These difunctional compounds are useful as polymer formers, such as polymerization catalysts and initiators, monomers, intermediates (e.g., prepolymers), polymer cross-linking and chain extending agents, herbicides and plant growth modifiers.

Prior art

Although monofunctional fluoroaliphatic sulfonamides have been known to the chemical art, difunctional fluoroaliphatic sulfonamides have not been known heretofore. The present compounds are a type of difunctional fluoroaliphatic sulfonamide, i.e. those which contain two phenyl rings, each of which is substituted by a fluoroaliphatic-sulfonamido group.

Detailed description of the invention

This invention relates to compounds of the formula $$(R_fSO_2NH\text{—}Ar)_2X \qquad (I)$$

wherein $R_f$ is a fluoroaliphatic radical, Ar is a phenylene or substituted phenylene radical and X is a carbon-carbon bond, a methylene or ethylene radical, divalent sulfur or oxygen or a sulfinyl or sulfonyl group, and salts thereof. The compounds of Formula I, which contain hydrogen bonded to the amide nitrogen can be considered to be in the acid form.

The fluoroaliphatic radical, $R_f$, can be generally described as a fluorinated saturated monovalent non-aromatic radical. The aliphatic chain preferably contains up to about twenty carbon atoms, since these are less difficult and expensive to obtain, and provide more efficient utilization of fluorine. The chain may be straight, branched or, if sufficiently large, cyclic and may include oxygen atoms or trivalent nitrogen atoms bonded only to carbon atoms. A fully fluorinated radical is preferred, but hydrogen or chlorine atoms may be present as substituents, provided that not more than about 25 percent of the fluorine atoms of the fully fluorinated radical have been replaced thereby.

For herbicidal and plant growth modifying use it is preferred that $R_f$ contain fewer than about four carbon atoms, and most preferably $R_f$ is trifluoromethyl, to provide more efficient utilization of fluorine, since longer fluoroaliphatic chains are expensive. The term "plant growth modifying" as used herein means effects including all deviations from natural development, for example, defoliation, stimulation, stunting, retardation, desiccation, tillering, dwarfing, regulation and the like.

When the compounds are used as polymer formers, especially as monomers, intermediates crosslinking agents or chain extenders, it may be desired to obtain oleophobic and hydrophobic properties from them. The chain length of $R_f$ and the amount of the compound can be varied according to the amount of hydrophobicity and oleophobicity required. Thus, where small amounts of compound are used a long fluoroaliphatic chain may be desired to obtain oleophobicity and hydrophobicity of the polymer surface. Generally, where oleophobic and/or hydrophobic properties are desired, the $R_f$ group chosen will contain at least three carbon atoms and a terminal $CF_3$ will be present therein. Inclusion of an oxygen atom linking two fluorinated carbon atoms or a nitrogen atom linking three fluorinated carbon atoms (as noted above) does not materially alter the oleophobic and hydrophobic properties of the aliphatic radical. Mixtures of various structures or chain lengths are commonly used since they are more readily commercially available.

The amido hydrogen atom of the compounds of Formula I may be neutralized by bases such as organic bases, inorganic bases such as metal hydroxides and even salts of some weak acids, such as sodium carbonate. Salts of the acid form compounds of this invention can be formed from a wide variety of cations, using simple neutralization reactions. The cations include alkali metals (e.g. lithium, sodium and potassium), alkaline earth metals (such as barium and calcium) and other metals such as aluminum and magnesium. These salts can be prepared by treating the corresponding compounds of Formula I with the appropriate base under mild conditions. The ammonium salts can be prepared similarly by treating the compounds of Formula I with ammonium hydroxide; and the salts of organic amines such as alkylamines, morpholine, methyl cyclohexylamine or glucosamine can be obtained by reacting the acid with the appropriate organic base. Salts of heavy metals such as zinc and iron are also within the purview of the invention.

When Ar is substituted phenylene in the compounds of the invention, many substituents are possible, but those most readily available are halogen, haloalkyl, alkyl, alkoxy, nitro, and amino. A preferred group of the substituted compounds are those which contain not more than two substituents per ring.

Representative compounds of the present invention include:

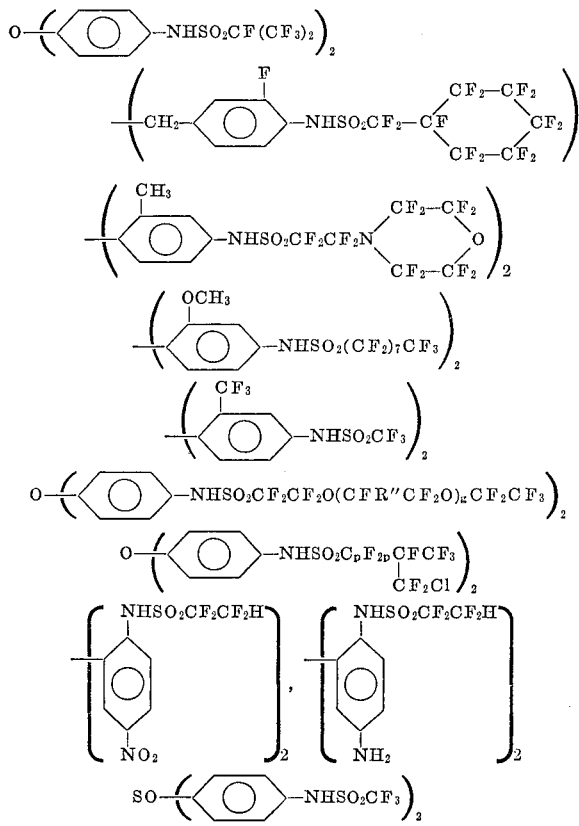

and

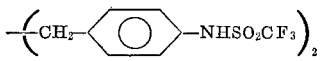

wherein *p* is an integer from one to about seventeen, *q* is a number from zero to about eight and R'' is fluorine or trifluoromethyl.

The compounds of the invention are available through several synthetic routes. Broadly, the compounds of Formula I are obtained by the reaction:

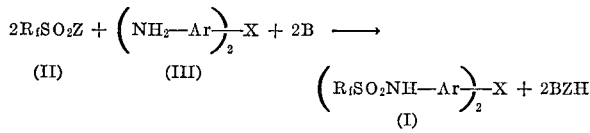

wherein Z is a fluoroaliphatic sulfonate residue or a halogen, preferably chlorine, since the chlorides are generally more readily available, and B is an acid acceptor such as a salt of a weak acid or an organic base, and $R_f$, Ar and X are as defined above.

Amines of the general formula of (III) above which provide compounds of the invention include 4,4′-diaminobiphenyl; 4,4′-oxydianiline; 3,3′-oxydianiline; 2,2′-oxydianiline; 4,4′-thiodianiline; 3,3′-sulfonyldianiline; 4,4′-sulfinyldianiline; 4,4′-sulfonyldianiline; bis-(4-aminophenyl) methane; bis(2,3,5,6-tetrachloro-4-aminophenyl) ether; 2,2′-diamino-4,4′-difluorobibenzyl; 3,3′-dimethoxy-4,4′-diaminobiphenyl; 3,3′-dimethyl-4,4′-diaminobiphenyl and 3,3′-ditrifluoromethyl-4,4′diaminobiphenyl. These compounds are generally known to the art, commercially available or may be prepared by known methods.

The reaction set out in the foregoing equation is generally carried out in a non-reactive solvent such as benzene, toluene, glyme, diglyme, diethyl ether, dichloromethane and the like. The reaction times vary from a few minutes (e.g. thirty minutes or less) to twenty-four hours or more, depending upon the reaction temperature and the reactivity of the reactants. It generally is desirable to adjust the temperature to minimize the reaction time while maintaining control of the exothermic reaction. Reaction temperatures used are generally from 0° to 50° C., since the reaction is usually rapid and exothermic, although the reaction mixture is stirred for one or more hours to insure the completion of the reaction. Equal equivalents of the reactants are generally used, although an excess of the fluoroaliphatic sulfonyl halide or anhydride can be used.

In addition to the method shown in the foregoing equation for the preparation of the compounds of Formula I, the phenyl substituted compounds thereof can be prepared from the corresponding unsubstituted compounds by many conventional reactions such as electrophilic substitution. For example, nitration or halogenation of compounds of Formula I makes a variety of substituents available. Since reactions of groups such as methyl, alkoxy, nitro, halogen and the like are available, conversion to other substituent groups on the aromatic nucleus is also possible.

Suitable fluoroaliphaticsulfonylanhydrides and halides (e.g. chlorides and fluorides) for use in the procedures are known to the art (e.g. see U.S. Pat. 2,732,398).

The compounds of this invention may be reacted with difunctional acid halides, chloroformates and the like to form prepolymers. Thus the reaction of one mole bis(trifluoromethylsulfonamidophenyl) ether with two moles of adipoyl chloride in the presence of an acid acceptor such as an organic base provides the compound shown below:

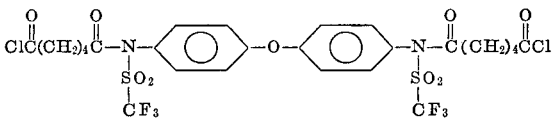

This prepolymer, and higher oligimers thereof (formed in smaller amounts) polymerizes with diamines, such as hexamethylene diamine, to form modified nylons. Alternatively, the disodium salt of the bis(trifluoromethylsulfonamidophenyl) ether may be reacted with adipoyl chloride without the use of an acid acceptor.

In a similar manner other compounds of the invention can be reacted with difunctional acid chlorides and choroformates known to the art to obtain prepolymers and higher molecular weight polymers, depending upon the relative amounts of the reactants utilized. The preparation of these polymers is straightforward and accomplished under very mild conditions by reaction of the sulfonamide disodium salt with the appropriate diacid halide. The synthesis may be carried out in acetone solution or interfacially. Thus the disodium salt of bis(4-trifluoromethylsulfonamidophenyl) ether was reacted with an equimolar quantity of terephthaloyl dichloride in acetone at room temperature to form a polyamide which melted at above 290° C. These reactants were also polymerized interfacially in water/methylene chloride. Also, the same disodium salt was reacted with an equimolar quantity of ClCO$_2$CH$_2$CH$_2$O$_2$CCl in acetone at room temperature to form the polyurethane which was then cast into a clean colorless film from methylene chloride. These polymers had recurring $R_fSO_2$— side groups along their main chains.

The compounds of the invention serve as acidic catalysts or initiators for certain polymerizations, for example those of epoxides and vinyl ethers. For use as polymerization catalysts, the compounds of the invention are mixed with the monomer or prepolymer. The rate of reaction and the degree of polymerization varies depending upon the temperature at which the polymerization is carried out and the reactivity of the monomer, and heating of the polymerization reaction is generally utilized to obtain a faster polymerization rate.

The epoxide monomer

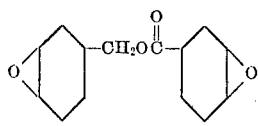

was polymerized using bis(trifluoromethylsulfonamidophenyl) ether in dichloromethane as an initiator by heating at 60 to 80° C. overnight to a clear, light yellow, flexible solid.

In the case of certain monomers, for example epoxides, the compounds of this invention participate in the polymerization reaction, and function as crosslinking agents and chain extending agents if added in sufficient amounts.

The plant growth regulating activity of representative compounds of Formula I was determined using screening tests against experimental plantings. Both pre- and post-emergence activity were determined in a direct screen against selected weed species. The following weed mixtures were used for the tests.

Grasses:
   Giant foxtail (*Setaria faberii*)
   Barnyard grass (*Echinochloa crusgalli*)
   Crabgrass (*Digitaria ischaemum*)
   Quack grass (*Agropyron repens*)
Broadleaves:
   Pigweed (*Amaranthus retroflexus*)
   Purslane (*Portulaca oleracea*)
   Wild mustard (*Brassica kaber*)
   Wild morning glory (*Convolvulus arvensis*)

The test chemicals were dissolved in a small amount of acetone or other suitable solvent and then diluted with water to give a concentration of 2000 p.p.m. From this concentration aliquots were diluted to give a final concentration of 500 p.p.m. Eighty ml. of this solution were added to a 6-inch pot containing the weed seeds to give a concentration equivalent to 20 lb./acre.

To assess post-emergence activity, the same weed mixtures were allowed to grow from 2 to 3 weeks until the grasses were approximately 1 to 3 inches and the broadleaves 1½ inches tall. They were sprayed for approximately 10 second or until good wetting of the leaf surfaces occurred with a 2000 p.p.m. solution as described above.

The following compounds of the invention were all active at 20 pounds per acre or 2000 p.p.m. or less:

bis(4-trifluoromethylsulfonamidophenyl) ether,
bis(4-trifluoromethylsulfonamidophenyl) sulfone,
bis(4-trifluoromethylsulfonamidophenyl) sulfide,
bis(4-trifluoromethylsulfonamidophenyl) methane and
bis(dichloro-4-trifluoromethylsulfonamidophenyl) ether.

Other compounds of Formula I are active when applied at greater or smaller rates of application. It will be appreciated that not all of the compounds are equally active.

For application to plants, the compounds can be finely divided and suspended in any of the usual aqueous media. In addition, spreading agents, wetting agents, sticking agents or other adjuvants can be added as desired. Dry powders, as such or diluted with inert materials such as diatomaceous earth, can likewise be used as dusts for this purpose. The preparations are coated on the plants or the ground is covered when pre-emergence control is desired. Application is made with the usual sprayers, dust guns and the like. Application rates are at 20–30 lbs./acre as a rule of thumb, but may be increased or reduced according to individual circumstances of use.

The following examples are given for the purpose of further illustrating the present invention, but are not intended in any way to be limiting of the scope thereof.

All parts are by weight unless otherwise specified in the examples. The melting points are uncorrected.

EXAMPLE 1

Bis(4-trifluoromethylsulfonamidophenyl) ether

Oxydianiline (10 g., 0.05 mole), glyme (200 ml.) and triethylamine (10.1 g., 0.10 mole) were stirred together. Trifluoromethanesulfonic anhydride (28.3 g., 0.10 mole) was added dropwise with external cooling (ice-bath), at such a rate as to maintain the reaction temperature below 30° C. Stirring was continued four hours after the completion of the addition. The reaction mixture was then diluted with enough 10 percent sodium hydroxide solution to adjust the pH of the mixture above 10. About 150 ml. were required. The mixture was washed four times with 100 ml. portions of dichloromethane, then treated with decolorizing charcoal. The solution was then acidified with hydrochloric acid to give a brown oil which solidified after cooling. This solid was recrystallized from benzene-cyclohexane to give white crystals of bis(4-trifluoromethylsulfonamidophenyl) ether, M.P. 145–147° C.

*Analysis.*—Calculated for $C_{14}H_{10}F_6N_2O_5S_2$ (percent): C, 36.2; H, 2.2. Found (percent): C, 36.8; H, 2.3.

Using the general procedure of Example 1 the following compounds were prepared:

| Ex. No. | Compound | Melting point in ° C. |
| --- | --- | --- |
| 2 | Bis(4-trifluoromethylsulfonamidophenyl) sulfone. | 231–232 |
| 3 | Bis(4-trifluoromethylsulfonamidophenyl) sulfide. | 153.5–155.5 |
| 4 | Bis(4-trifluoromethylsulfonamidophenyl) methane. | 106.5–107.5 |

EXAMPLE 5

Bis(4-trifluoromethylsulfonamidophenyl) ether (9.1 g., 0.02 mole) was dissolved in glacial acetic acid (75 ml.), aluminum chloride (1 g.) was added and chlorine gas was bubbled through the reaction mixture, at a rate of 0.3 g./min. while the solution was heated at 50° C., for four hours. The solution was poured into one liter of ice and water, stirred for thirty minutes and cooled overnight in a refrigerator. The white precipitate was separated by filtration, dried and recrystallized from hexane-benzene to yield bis(dichloro-4-trifluoromethylsulfonamidophenyl) ether, M.P. 142–145° C.

*Analysis.*—Calculated for $C_{14}H_6Cl_4F_6N_2O_5S_2$ (percent): C, 27.9; H, 1.0; Cl, 23.6. Found (percent): C, 28.3; H, 1.2; Cl, 23.3.

What is claimed is:

1. A compound of the formula:

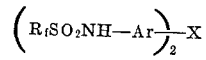

wherein $R_f$ is a fluorinated group selected from alkyl of up to 20 carbon atoms which may be interrupted by up to 9 oxy groups, cyclohexylmethyl, and morpholino-ethyl, provided that not more than 25 percent of the fluorine atoms in the completely fluorinated group may be replaced by hydrogen and chlorine, Ar is phenylene or substituted phenylene wherein the substituents are selected from chlorine, fluorine, trifluoromethyl, methyl, methoxy, nitro and amino, and X is a carbon-carbon bond, a methylene or ethylene radical, divalent sulfur or oxygen or a sulfinyl or sulfonyl group, and salts thereof.

2. A compound according to claim 1, wherein $R_f$ is trifluoromethyl.

3. A compound according to claim 2 wherein Ar is phenylene.

4. A compound according to claim 2 wherein Ar is chlorine- or fluorine-(halogen-) substituted phenylene.

5. A compound according to claim 1 wherein X is oxygen.

6. A compound according to claim 1 wherein X is sulfonyl.

7. A compound according to claim 1 wherein X is sulfur.

8. A compound according to claim 1 wherein X is methylene.

9. Bis(4-trifluoromethylsulfonamidophenyl) ether according to claim 5.

10. Bis(4-trifluoromethylsulfonamidophenyl) sulfone according to claim 6.

11. Bis(4-trifluoromethylsulfonamidophenyl) sulfide according to claim 7.

12. Bis(4-trifluoromethylsulfonamidophenyl) methane according to claim 8.

13. Bis(dichloro - 4-trifluoromethylsulfonamidophenyl) ether, according to claim 5.

References Cited
UNITED STATES PATENTS 3,321,445   5/1967   Lazerte et al. _____ 260—75

HENRY R. JILES, Primary Examiner

C. M. SHURKO, Assistant Examiner

U.S. Cl. X.R.

71—88, 103; 260—79.3, 429.9, 439, 544, 556, 830, 246